(12) United States Patent
Crane, Jr. et al.

(10) Patent No.: US 7,244,281 B2
(45) Date of Patent: Jul. 17, 2007

(54) METHOD AND APPARATUS FOR TRAPPING AND PURGING SOOT FROM A FUEL REFORMER

(75) Inventors: Samuel N. Crane, Jr., Columbus, IN (US); William Taylor, III, Columbus, IN (US)

(73) Assignee: Arvin Technologies, Inc., Troy, MI (US)

( * ) Notice: Subject to any disclaimer, the term of this patent is extended or adjusted under 35 U.S.C. 154(b) by 437 days.

(21) Appl. No.: 10/693,242

(22) Filed: Oct. 24, 2003

(65) Prior Publication Data

US 2005/0086865 A1  Apr. 28, 2005

(51) Int. Cl.
- B32B 5/02 (2006.01)
- B01J 19/08 (2006.01)
- B01J 10/00 (2006.01)
- C10J 3/00 (2006.01)
- G05B 1/00 (2006.01)

(52) U.S. Cl. .................... 48/128; 48/61; 48/127.9; 48/211; 48/215; 422/186.21; 422/186.22; 422/183; 422/182; 422/186.03; 422/186.04; 422/129; 422/211; 422/217; 422/105; 422/107; 422/110

(58) Field of Classification Search .................. 60/275, 60/295, 297, 285; 48/61
See application file for complete search history.

(56) References Cited

U.S. PATENT DOCUMENTS

| | | | |
|---|---|---|---|
| 2,787,730 A | 4/1957 | Berghaus et al. | 315/111.01 |
| 3,018,409 A | 1/1962 | Berghaus et al. | 315/111.01 |
| 3,035,205 A | 5/1962 | Berghaus et al. | 315/111.01 |
| 3,423,562 A | 1/1969 | Jones et al. | 219/121.12 |
| 3,594,609 A | 7/1971 | Vas | 315/111.41 |
| 3,622,493 A | 11/1971 | Crusco | 422/186.23 |
| 3,649,195 A | 3/1972 | Cook et al. | 423/450 |
| 3,755,131 A | 8/1973 | Shalit | 204/246 |
| 3,779,182 A | 12/1973 | Camacho | 110/234 |
| 3,841,239 A | 10/1974 | Nakamura et al. | 110/342 |
| 3,879,680 A | 4/1975 | Naismith et al. | 423/240 R |
| 3,894,605 A | 7/1975 | Salvadorini | 180/65.4 |
| 3,982,962 A | 9/1976 | Bloomfield | 429/19 |
| 3,992,277 A | 11/1976 | Trieschmann et al. | 204/172 |
| 4,036,131 A | 7/1977 | Elmore | 101/247 |
| 4,036,181 A | 7/1977 | Matovich | 123/3 |

(Continued)

Primary Examiner—Glenn Caldarola
Assistant Examiner—Kaity Handal
(74) Attorney, Agent, or Firm—Barnes & Thornburg LLP

(57) ABSTRACT

A plasma fuel reformer assembly for producing reformate gas includes a fuel reformer having an air/fuel input assembly, an electrode assembly, and a soot trap positioned downstream of the electrode assembly. The electrode assembly includes a first electrode and a second electrode that is spaced apart from the first electrode. The fuel reformer further includes a reformer controller electrically coupled to the air/fuel input assembly. The reformer controller includes a processing unit electrically connected to a memory unit. Stored in the memory unit is a plurality of memory instructions that, when executed by the processing unit, causes the processing unit to: operate the air/fuel input assembly so as to advance a first air/fuel mixture with a first air-to-fuel ratio into the fuel reformer, determine if a soot purge of the soot trap is to be performed and generate a purge-soot signal in response thereto, and operate the air/fuel input assembly so as to advance a second air/fuel mixture having a second air-to-fuel ratio greater than the first air-to-fuel ratio into the fuel reformer.

8 Claims, 9 Drawing Sheets

U.S. PATENT DOCUMENTS

| | | | |
|---|---|---|---|
| 4,059,416 A | 11/1977 | Matovich | 48/197 R |
| 4,099,489 A | 7/1978 | Bradley | 123/3 |
| 4,144,444 A | 3/1979 | Dementiev et al. | 219/383 |
| 4,168,296 A | 9/1979 | Lundquist | 423/56 |
| 4,303,552 A | 12/1981 | Ernest et al. | 252/465 |
| 4,339,564 A | 7/1982 | Okamura | 528/15 |
| 4,359,862 A | 11/1982 | Virk et al. | 60/274 |
| 4,372,111 A | 2/1983 | Virk et al. | 60/274 |
| 4,436,793 A | 3/1984 | Adlhart | 429/17 |
| 4,451,441 A | 5/1984 | Ernest et al. | 423/213.2 |
| 4,458,634 A | 7/1984 | Carr et al. | 123/3 |
| 4,469,932 A | 9/1984 | Spiegelberg et al. | 219/121.37 |
| 4,473,622 A | 9/1984 | Chludzinski et al. | 429/17 |
| 4,477,417 A | 10/1984 | Domesle et al. | 423/213.2 |
| 4,485,621 A | 12/1984 | Wong et al. | 60/274 |
| 4,515,758 A | 5/1985 | Domesle et al. | 502/34 |
| 4,516,990 A | 5/1985 | Erdmannsdorfer et al. | 95/15 |
| 4,522,894 A | 6/1985 | Hwang et al. | 429/17 |
| 4,535,588 A | 8/1985 | Sato et al. | 60/286 |
| 4,576,617 A | 3/1986 | Renevot | 95/279 |
| 4,578,955 A | 4/1986 | Medina | 60/709 |
| 4,625,511 A | 12/1986 | Scheitlin et al. | 60/299 |
| 4,625,681 A | 12/1986 | Sutekiyo | 123/3 |
| 4,645,521 A | 2/1987 | Freesh | 55/309 |
| 4,651,524 A | 3/1987 | Brighton | 60/274 |
| 4,657,829 A | 4/1987 | McElroy et al. | 429/19 |
| 4,670,233 A | 6/1987 | Erdmannsdoerfer et al. | 423/213.2 |
| 4,720,376 A | 1/1988 | Laue et al. | 423/239 |
| 4,720,972 A | 1/1988 | Rao et al. | 60/274 |
| 4,759,918 A | 7/1988 | Homeier et al. | 423/213.5 |
| 4,828,807 A | 5/1989 | Domesle et al. | 423/213.7 |
| 4,830,492 A | 5/1989 | Ko | 356/313 |
| 4,841,925 A | 6/1989 | Ward | 123/143 B |
| 4,849,274 A | 7/1989 | Cornelison | 428/116 |
| 4,902,487 A | 2/1990 | Cooper et al. | 423/215.5 |
| 4,928,227 A | 5/1990 | Burba et al. | 701/66 |
| 4,963,792 A | 10/1990 | Parker | 315/58 |
| 4,967,118 A | 10/1990 | Urataki et al. | 315/56 |
| 5,095,247 A | 3/1992 | Hanamura | 315/111.21 |
| 5,138,959 A | 8/1992 | Kulkarni | 110/346 |
| 5,143,025 A | 9/1992 | Munday | 123/3 |
| 5,159,900 A | 11/1992 | Dammann | 123/3 |
| 5,205,912 A | 4/1993 | Murphy | 204/157.15 |
| 5,207,185 A | 5/1993 | Greiner et al. | 123/3 |
| 5,212,431 A | 5/1993 | Origuchi et al. | 318/139 |
| 5,228,529 A | 7/1993 | Rosner | 180/65.3 |
| 5,272,871 A | 12/1993 | Oshima et al. | 60/274 |
| 5,284,503 A | 2/1994 | Bitler et al. | 588/311 |
| 5,293,743 A | 3/1994 | Usleman et al. | 60/299 |
| 5,317,996 A | 6/1994 | Lansing | 123/216 |
| 5,362,939 A | 11/1994 | Hanus et al. | 219/121.59 |
| 5,409,784 A | 4/1995 | Bromberg et al. | 429/13 |
| 5,409,785 A | 4/1995 | Nakano et al. | 429/33 |
| 5,412,946 A | 5/1995 | Oshima et al. | 60/286 |
| 5,425,332 A | 6/1995 | Rabinovich et al. | 123/3 |
| 5,437,250 A | 8/1995 | Rabinovich et al. | 123/3 |
| 5,441,401 A | 8/1995 | Yamaguro et al. | 431/4 |
| 5,445,841 A | 8/1995 | Arendt et al. | 426/312 |
| 5,451,740 A | 9/1995 | Hanus et al. | 219/121.59 |
| 5,560,890 A | 10/1996 | Berman et al. | 422/186.04 |
| 5,599,758 A | 2/1997 | Guth et al. | 502/34 |
| 5,660,602 A | 8/1997 | Collier, Jr. et al. | 48/127.3 |
| 5,666,923 A | 9/1997 | Collier, Jr. et al. | 123/488 |
| 5,746,989 A | 5/1998 | Murachi et al. | 423/212 R |
| 5,787,864 A | 8/1998 | Collier, Jr. et al. | 123/492 |
| 5,813,222 A | 9/1998 | Appleby | 60/274 |
| 5,826,548 A | 10/1998 | Richardson, Jr. | 123/3 |
| 5,845,485 A | 12/1998 | Murphy et al. | 60/274 |
| 5,847,353 A | 12/1998 | Titus et al. | 219/121.36 |
| 5,852,927 A | 12/1998 | Cohn et al. | 60/786 |
| 5,863,413 A | 1/1999 | Caren et al. | 205/688 |
| 5,887,554 A | 3/1999 | Cohn et al. | 123/3 |
| 5,894,725 A | 4/1999 | Cullen et al. | 60/274 |
| 5,910,097 A | 6/1999 | Boegner et al. | 60/278 |
| 5,921,076 A | 7/1999 | Krutzsch et al. | 60/274 |
| 5,974,791 A | 11/1999 | Hirota et al. | 60/276 |
| 6,012,326 A | 1/2000 | Raybone et al. | 73/31.02 |
| 6,014,593 A | 1/2000 | Grufman | 700/136 |
| 6,038,853 A | 3/2000 | Penetrante et al. | 60/274 |
| 6,038,854 A | 3/2000 | Penetrante et al. | 60/297 |
| 6,047,543 A | 4/2000 | Caren et al. | 60/275 |
| 6,048,500 A | 4/2000 | Caren et al. | 422/186.3 |
| 6,082,102 A | 7/2000 | Wissler et al. | 60/286 |
| 6,122,909 A | 9/2000 | Murphy et al. | 60/286 |
| 6,125,629 A | 10/2000 | Patchett | 60/286 |
| 6,130,260 A | 10/2000 | Hall et al. | 518/703 |
| 6,134,882 A | 10/2000 | Huynh et al. | 60/274 |
| 6,152,118 A | 11/2000 | Sasaki et al. | 123/568.21 |
| 6,153,162 A | 11/2000 | Fetzer et al. | 423/239 |
| 6,176,078 B1 | 1/2001 | Balko et al. | 60/274 |
| 6,193,942 B1 | 2/2001 | Okuda et al. | 423/213.2 |
| 6,235,254 B1 | 5/2001 | Murphy et al. | 423/212 |
| 6,248,684 B1 | 6/2001 | Yavuz et al. | 502/66 |
| 6,284,157 B1 | 9/2001 | Eliasson et al. | 252/373 |
| 6,287,527 B1 | 9/2001 | Kawanami et al. | 423/213.2 |
| 6,294,141 B1 | 9/2001 | Twigg et al. | 423/213.7 |
| 6,311,232 B1 | 10/2001 | Cagle et al. | 710/8 |
| 6,322,757 B1 | 11/2001 | Cohn et al. | 422/186.04 |
| 7,014,930 B2 * | 3/2006 | Daniel et al. | 429/17 |
| 2002/0012618 A1 | 1/2002 | Bromberg et al. | 422/190 |
| 2002/0194835 A1 | 12/2002 | Bromberg et al. | 60/275 |
| 2003/0200742 A1* | 10/2003 | Smaling | 60/275 |
| 2004/0050345 A1* | 3/2004 | Bauer | 123/3 |

* cited by examiner

METHOD AND APPARATUS FOR TRAPPING AND PURGING SOOT FROM A FUEL REFORMER

CROSS REFERENCE TO RELATED APPLICATION

Cross reference is made to copending U.S. patent application Ser. No. 10/692,840 entitled "Apparatus and Method for Operating a Fuel Reformer so as to Purge Soot Therefrom" which is filed concurrently herewith.

FIELD OF THE DISCLOSURE

The present disclosure relates generally to a control system for a fuel reformer, and more particularly to a control system for trapping and purging soot from a fuel reformer.

BACKGROUND OF THE DISCLOSURE

Fuel reformers reform hydrocarbon fuel into a reformate gas such as hydrogen-rich gas. In the case of an onboard fuel reformer of a vehicle or a stationary power generator, the reformate gas produced by the fuel reformer may be utilized as fuel or fuel additive in the operation of an internal combustion engine. The reformate gas may also be utilized to regenerate or otherwise condition an emission abatement device associated with an internal combustion engine or as a fuel for a fuel cell.

SUMMARY OF THE DISCLOSURE

According to an illustrative embodiment, a method of operating a fuel reformer includes advancing a first air/fuel mixture having a first air-to-fuel ratio into the fuel reformer. The method also includes entrapping soot generated by the fuel reformer in a soot trap. The method also includes determining if a soot purge of the soot trap is to be performed and generating a purge-soot signal in response thereto. The method further includes advancing a second air/fuel mixture having a second air-to-fuel ratio into the fuel reformer in response to the purge-soot signal. The second air-to-fuel ratio is greater than the first air-fuel-ratio ratio in order to purge soot particulates from the soot trap.

The determining step may include sensing the amount of soot within the soot trap and generating a soot accumulation control signal when the amount of soot with the reformer reaches a predetermined accumulation level. The step of advancing the second mixture occurs in response to the generation of the soot accumulation control signal.

The determining step may also include determining if a predetermined period of time has elapsed since the soot trap was last purged of soot, and generating a time-lapsed control signal in response thereto. The step of advancing the second mixtures may include advancing the second air/fuel mixture in response to generation of the time-lapsed control signal.

According to another illustrative embodiment, there is provided a fuel reformer assembly for producing a reformate gas. The fuel reformer assembly includes a fuel reformer having an air/fuel input assembly and a soot trap. The fuel reformer assembly further includes a reformer controller electrically coupled to the air/fuel input assembly. The reformer controller includes a processing unit and a memory unit electrically coupled to the processing unit. The memory unit has stored therein a plurality of instructions which, when executed by the processing unit, causes the processing unit to (i) operate the air/fuel input assembly so as to advance a first mixture with a first air-to-fuel ratio into the fuel reformer, (ii) determine if a soot purge of the soot trap is to be performed and generate a purge-soot signal in response thereto, and (iii) operate the air/fuel input assembly so as to advance a second air/fuel mixture having a second air-to-fuel ratio greater than the first air-to-fuel ratio into the fuel reformer.

According to still another illustrative embodiment, there is provided a method of operating a fuel reformer including entrapping soot in a soot trap and advancing air in the absence of fuel into the fuel reformer so as to combust soot present in the soot trap.

The above and other features of the present disclosure will become apparent from the following description and the attached drawings.

DETAILED DESCRIPTION OF THE DRAWINGS

Figure 1:
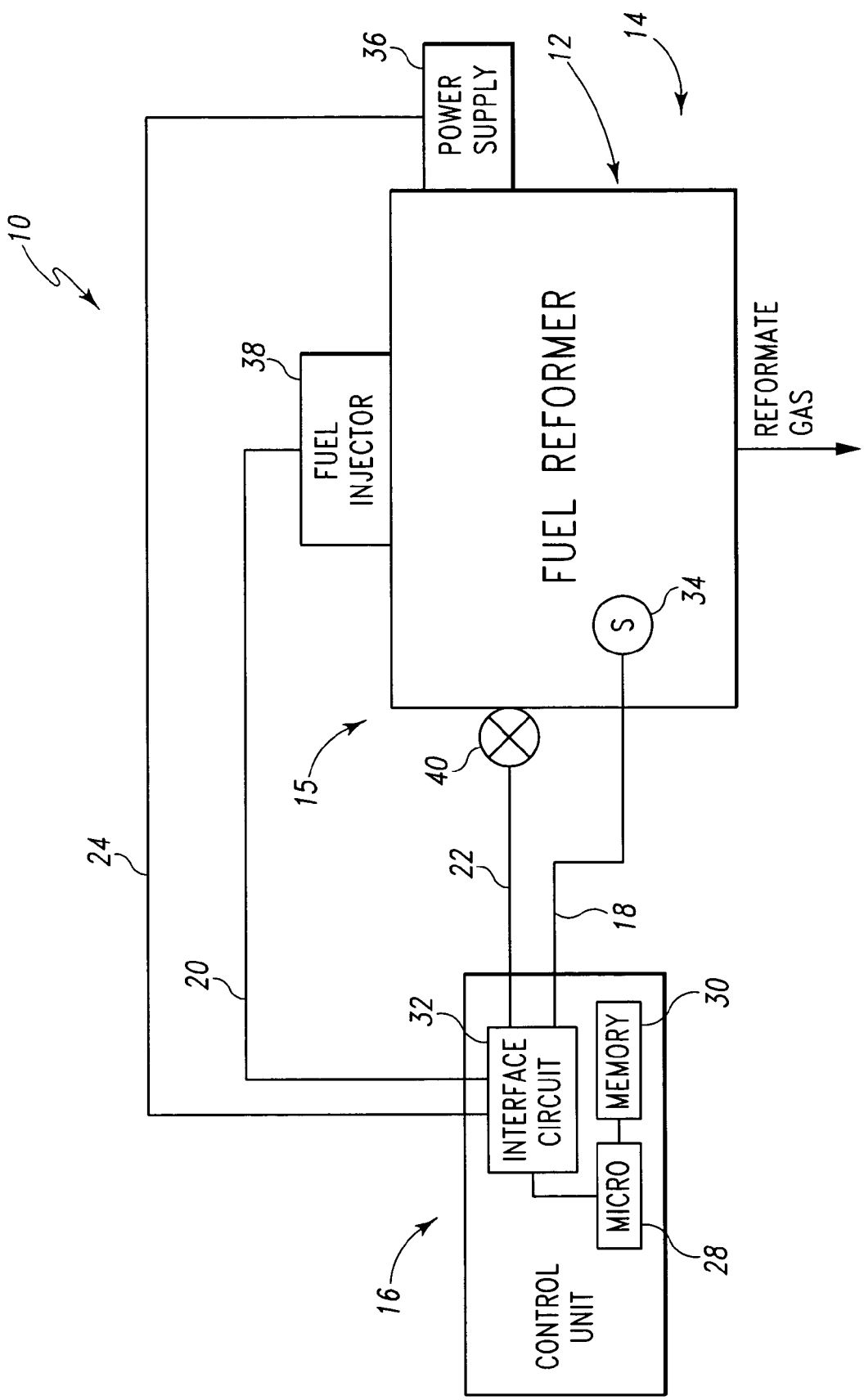
FIG. 1 is a simplified block diagram of a fuel reforming assembly having a fuel reformer under the control of an electronic control unit.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Figure 2:
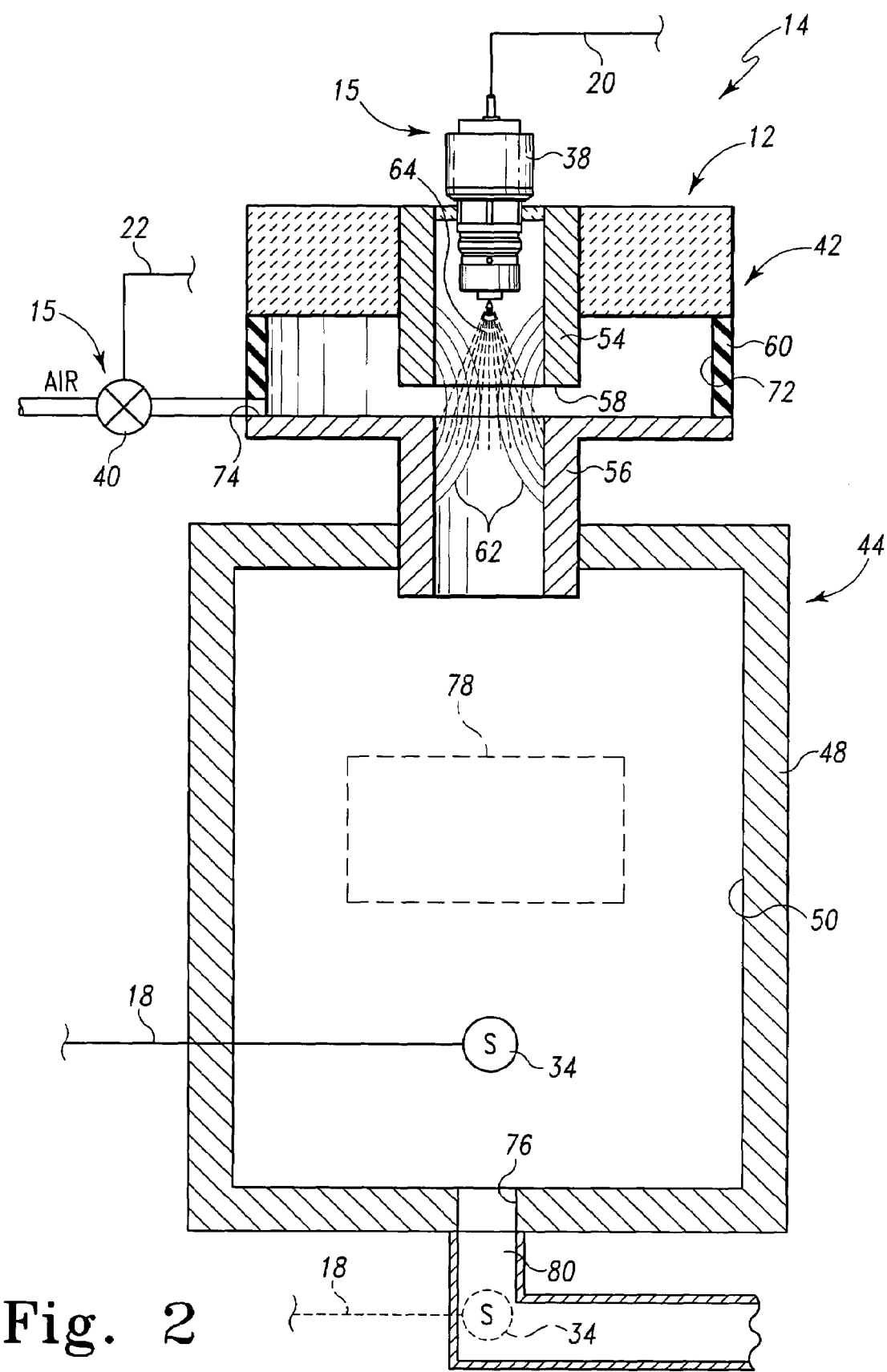
FIG. 2 is a diagrammatic cross sectional view of a plasma fuel reformer which may be used in the construction of the fuel reforming assembly of FIG. 1.

Referring now to FIGS. 1 and 2, there is shown a fuel reforming assembly 10 having a fuel reformer 14 and a control unit 16. The fuel reformer 14 includes an air/fuel input assembly 15 coupled to the control unit 16 for varying the amount of air and/or fuel injected into a housing of fuel reformer 14. The air/fuel input assembly 15 may be operated to purge the fuel reformer 14 of soot particulates which may accumulate therein, as is discussed in greater detail below. The fuel reformer 14 reforms (i.e., converts) hydrocarbon fuels into a reformate gas that includes, amongst other things, hydrogen gas. As such, the fuel reformer 14, amongst other uses, may be used in the construction of an onboard fuel reforming system for a vehicle of a stationary power generator. In such a way, the reformate gas produced by the fuel reformer 14 may be utilized as fuel or fuel additive in the operation of an internal combustion engine thereby increasing the efficiency of the engine while also reducing emissions produced by the engine. The reformate gas from the fuel reformer 14 may also be utilized to regenerate or otherwise condition an emission abatement device associated with the internal combustion engine. In addition, if the vehicle or the stationary power generator is equipped with a fuel cell such as, for example, an auxiliary power unit (APU), the reformate gas from the fuel reformer 14 may also be used as a fuel for the fuel cell.

The fuel reformer 14 may be embodied as any type of fuel reformer such as, for example, a catalytic fuel reformer, a thermal fuel reformer, a steam fuel reformer, or any other type of partial oxidation fuel reformer. The fuel reformer 14 may also be embodied as a plasma fuel reformer 12. A plasma fuel reformer uses plasma to convert a mixture of air and hydrocarbon fuel into a reformate gas which is rich in, amongst other things, hydrogen gas and carbon monoxide. Systems including plasma fuel reformers are disclosed in U.S. Pat. No. 5,425,332 issued to Rabinovich et al.; U.S. Pat. No. 5,437,250 issued to Rabinovich et al.; U.S. Pat. No. 5,409,784 issued to Bromberg et al.; and U.S. Pat. No. 5,887,554 issued to Cohn, et al., the disclosures of each of which are hereby incorporated by reference. Additional examples of systems including plasma fuel reformers are disclosed in copending U.S. patent application Ser. No. 10/158,615 entitled "Low Current Plasmatron Fuel Converter Having Enlarged Volume Discharges" which was filed on May 30, 2002 by A. Rabinovich, N. Alexeev, L. Bromberg, D. Cohn, and A. Samokhin, along with copending U.S. patent application Ser. No. 10/411,917 entitled "Plasmatron Fuel Converter Having Decoupled Air Flow Control" which was filed on Apr. 11, 2003 by A. Rabinovich, N. Alexeev, L. Bromberg, D. Cohn, and A. Samokhin, the disclosures of both of which are hereby incorporated by reference.

For purposes of the following description, the concepts of the present disclosure will herein be described in regard to a plasma fuel reformer. However, as described above, the fuel reformer of the present disclosure may be embodied as any type of fuel reformer, and the claims attached hereto should not be interpreted to be limited to any particular type of fuel reformer unless expressly defined therein.

As mentioned above, the plasma fuel reformer 12 reforms a mixture of air and hydrocarbon fuel into a reformate gas. A byproduct of this process is the formation of soot particulates (or simply "soot"). These soot particulates may accumulate within the plasma fuel reformer 12. Therefore, it may become desirable to purge the fuel reformer 12 of the soot particulates. As is discussed in greater detail below, fuel reformer assembly 10 operates to increase an air-to-fuel ratio of an air/fuel mixture being processed by the plasma fuel reformer 12 to cause the plasma reformer 12 to burn the soot particulates from the reformer 12. The air-to-fuel ratio may be adjusted in various ways in response to various signals.

As shown in FIG. 2, the plasma fuel reformer 12 includes air/fuel input assembly 15, a plasma-generating assembly 42, and a reactor 44. Air/fuel input assembly 15 is secured to plasma-generating assembly 42 and includes a fuel injector 38 and an air inlet valve 40, each of which is electrically coupled to control unit 16, as is described in more detail below. The reactor 44 includes a reactor housing 48 having a reaction chamber 50 defined therein. The plasma-generating assembly 42 is secured to an upper portion of the reactor housing 48. The plasma-generating assembly 42 includes an upper electrode 54 and a lower electrode 56. The electrodes 54, 56 are spaced apart from one another so as to define an electrode gap 58 therebetween. An insulator 60 electrically insulates the electrodes from one another.

The electrodes 54, 56 are electrically coupled to an electrical power supply 36 (see FIG. 1) such that, when energized, a plasma arc 62 is created across the electrode gap 58 (i.e., between the electrodes 54, 56). Fuel injector 38 injects a hydrocarbon fuel 64 into the plasma arc 62. The fuel injector 38 may be any type of fuel injection mechanism which injects a desired amount of fuel into plasma-generating assembly 42. In certain configurations, it may be desirable to atomize the fuel prior to, or during, injection of the fuel into the plasma-generating assembly 42. Such fuel injector assemblies (i.e., injectors which atomize the fuel) are commercially available.

The lower electrode 56 extends downwardly into the reactor housing 48. As such, gas (either reformed or partially reformed) exiting the plasma arc 62 is advanced into the reaction chamber 50. One or more catalysts 78 may be positioned in reaction chamber 50. The catalysts 78 complete the fuel reforming process, or otherwise treat the gas, prior to exit of the reformate gas through a gas outlet 76. It is within the scope of this disclosure to embody the plasma fuel reformer 12 without a catalyst positioned in the reaction chamber 50.

As shown one exemplary embodiment in FIG. 2, the plasma fuel reformer 12 has a soot sensor 34 associated therewith. The soot sensor 34 is used to determine the amount of soot particulates which have accumulated within the reaction chamber 50. Particulate soot is a byproduct of the fuel reforming process. Such soot particulates are highly conductive. Therefore, the soot sensor 34 operates to indirectly measure the amount of soot particulates present by sensing changes in electrical conductivity as soot accumulates on the sensor 34. Sensor 34 may sense conductivity, for example, by measuring the resistance across two points of the sensor 34. As soot accumulates on the sensor 34, the resistance between the two points decreases. In other words, the conductivity across the sensor 34 rises as the amount of soot particulates increase.

The soot sensor 34 may be located in any number of locations so as to effectively measure the amount of soot particulate accumulation within fuel reformer 12. In particular, as shown in solid lines, the soot sensor 34 may be positioned within the reaction chamber 50 to sense the amount of soot accumulated therein. Alternatively, as shown in phantom, the soot sensor may be positioned so as to sense the amount of soot accumulated within a gas conduit 80 for carrying the reformate gas therethrough subsequent to being exhausted through the outlet 76.

It should also be appreciated that the amount of soot present within chamber 50 or conduit 80 may also be determined by placing a pressure sensor (not shown) on each side of a substrate in the assembly 10, such as on a filter or catalyst 78, for example, to sense or measure the pressure on each side of the substrate and thus determine the pressure difference between the two sensors. The pressure difference between the two sensors is indicative of the amount of soot which has accumulated on the substrate. Therefore, as the soot particulates increase, the pressure difference between the two sensors increases as well. Once the pressure difference between the two sensors reaches a certain predetermined level, for example, the system 10 may be signaled to purge the soot particulates, as is discussed in more detail below.

Hence, it should be appreciated that the herein described concepts are not intended to be limited to any particular method or device for determining the amount of soot particulates which accumulate in the plasma fuel reformer 12. In particular, the amount of accumulated soot may be determined by use of any type of sensor located in any sensor location and utilizing any methodology for obtaining the amount of soot accumulated within plasma fuel reformer 12.

As shown in FIG. 2, the plasma-generating assembly 42 has an annular air chamber 72 for receiving pressurized air therein. Pressurized air is advanced into the air chamber 72 through an air inlet 74 and is thereafter directed radially inwardly through the electrode gap 58 so as to "bend" the plasma arc 62 inwardly. Such bending of the plasma arc 62 ensures that the injected fuel 64 is directed through the plasma arc 62. Such bending of the plasma arc 62 also reduces erosion of the electrodes 56, 58.

Moreover, advancement of air into the electrode gap 58 also produces a desired mixture of air and fuel ("air/fuel mixture") to create a certain air-to-fuel ratio. In particular, the plasma reformer 12 reforms or otherwise processes the fuel in the form of a mixture of air and fuel. As is defined in this specification, the term "air/fuel mixture" is defined to mean a mixture of any amount of air and any amount of fuel including a "mixture" of only air or a "mixture" of only fuel. For example, as used herein, the term "air/fuel mixture" may be used to describe an amount of air that is devoid of fuel. Moreover, the term "air-to-fuel ratio" is intended to mean the relation between the air component and the fuel component of such air/fuel mixtures including air/fuel mixtures which are devoid of one component or the other. For example, as used herein, the term "air-to-fuel ratio" may be used to describe an air/fuel mixture which is devoid of fuel even though the quantity of one component (i.e., the fuel component) is zero.

The air-to-fuel ratio of the air/fuel mixture being processed by the plasma reformer 12 may be varied by increasing or decreasing the amount of fuel entering the plasma reformer 12 through fuel injector 38 or by increasing or decreasing the amount of air entering the plasma reformer 12 through air inlet valve 40 associated therewith. The air inlet valve 40 may be embodied as any type of electronically controlled air valve. The air inlet valve 40 may be embodied as a discrete device, as shown in FIG. 2, or may be integrated into the design of the plasma fuel reformer 12. In either case, the air inlet valve 40 controls the amount of air that is introduced into the plasma-generating assembly 42 of plasma reformer 12.

As mentioned above, plasma fuel reformer 12 also includes fuel injector 38. Fuel injector 38 and air inlet valve 40 cooperate to form air/fuel input assembly 15 for controlling the air-to-fuel ratio of the air/fuel mixture being processed by the plasma reformer 12. Operation of either the fuel injector 38, or the air inlet valve 40, or both may be used to control the air-to-fuel ratio of the mixture being processed in the plasma fuel reformer 12. In particular, by positioning the air inlet valve 40 so as to increase the flow of air therethrough, the air-to-fuel ratio of the air/fuel mixture being processed by the fuel reformer 12 may be increased. Conversely, by positioning the air inlet valve 40 so as to decrease the flow of air therethrough, the air-to-fuel ratio of the air/fuel mixture may be decreased. As will be described in greater detail below, increasing the air-to-fuel ratio increases the amount of oxygen present within the plasma reformer 12 thereby allowing for the igniting and burning of any soot particulates which are present or may have accumulated therein.

As mentioned above, the air-to-fuel ratio of the air/fuel mixture can also be varied by controlling the amount of fuel (via fuel injector 38) that is introduced into the plasma-generating assembly 42. For example, decreasing the amount of fuel entering plasma-generating assembly 42 also increases the air-to-fuel ratio.

As mentioned above and shown in FIG. 1, the plasma fuel reformer 12 and its associated components are under the control of control unit 16. In particular, the soot sensor 34 is electrically coupled to the electronic control unit 16 via a signal line 18, the fuel injector 38 is electrically coupled to the electronic control unit 16 via a signal line 20, the air inlet valve 40 is electrically coupled to the electronic control unit 16 via a signal line 22, and the power supply 36 is electrically coupled to the electronic control unit 16 via a signal line 24. Although the signal lines 18, 20, 22, 24 are shown schematically as a single line, it should be appreciated that the signal lines may be configured as any type of signal carrying assembly which allows for the transmission of electrical signals in either one or both directions between the electronic control unit 16 and the corresponding component. For example, any one or more of the signal lines 18, 20, 22, 24 may be embodied as a wiring harness having a number of signal lines which transmit electrical signals between the electronic control unit 16 and the corresponding component. It should be appreciated that any number of other wiring configurations may also be used. For example, individual signal wires may be used, or a system utilizing a signal multiplexer may be used for the design of any one or more of the signal lines 18, 20, 22, 24. Moreover, the signal lines 18, 20, 22, 24 may be integrated such that a single harness or system is utilized to electrically couple some or all of the components associated with the plasma fuel reformer 12 to the electronic control unit 16.

The electronic control unit 16 is, in essence, the master computer responsible for interpreting electrical signals sent by sensors associated with the plasma fuel reformer 12 and for activating electronically-controlled components associated with the plasma fuel reformer 12 in order to control the plasma fuel reformer 12. For example, the electronic control unit 16 of the present disclosure is operable to, amongst many other things, determine the beginning and end of each injection cycle of fuel into the plasma-generating assembly 42, calculate and control the amount and ratio of air and fuel to be introduced into the plasma-generating assembly 42, determine the amount of soot accumulated within the plasma reformer 12, and determine the power level to supply to the plasma fuel reformer 12.

To do so, the electronic control unit 16 includes a number of electronic components commonly associated with electronic units which are utilized in the control of electromechanical systems. For example, the electronic control unit 16 may include, amongst other components customarily included in such devices, a processor such as a microprocessor 28 and a memory device 30 such as a programmable read-only memory device ("PROM") including erasable PROM's (EPROM's or EEPROM's). The memory device 30 is provided to store, amongst other things, instructions in the form of, for example, a software routine (or routines) which, when executed by the processing unit, allows the electronic control unit 16 to control operation of the plasma fuel reformer 12.

The electronic control unit 16 also includes an analog interface circuit 32. The analog interface circuit 32 converts the output signals from the various fuel reformer sensors (e.g., the soot sensor 34) into a signal which is suitable for presentation to an input of the microprocessor 28. In particular, the analog interface circuit 32, by use of an analog-to-digital (A/D) converter (not shown) or the like, converts the analog signals generated by the sensors into a digital signal for use by the microprocessor 28. It should be appreciated that the A/D converter may be embodied as a discrete device or number of devices, or may be integrated into the microprocessor 28. It should also be appreciated that if any one or more of the sensors associated with the fuel reformer 14 generate a digital output signal, the analog interface circuit 32 may be bypassed.

Similarly, the analog interface circuit 32 converts signals from the microprocessor 28 into an output signal which is suitable for presentation to the electrically-controlled components associated with the plasma fuel reformer 12 (e.g., the fuel injector 38, the air inlet valve 40, or the power supply 36). In particular, the analog interface circuit 32, by use of a digital-to-analog (D/A) converter (not shown) or the like, converts the digital signals generated by the microprocessor 28 into analog signals for use by the electronically-controlled components associated with the fuel reformer 12 such as the fuel injector 38, the air inlet valve 40, or the power supply 36. It should be appreciated that, similar to the A/D converter described above, the D/A converter may be embodied as a discrete device or number of devices, or may be integrated into the microprocessor 28. It should also be appreciated that if any one or more of the electronically-controlled components associated with the plasma fuel reformer 12 operate on a digital input signal, the analog interface circuit 32 may be bypassed.

Hence, the electronic control unit 16 may be operated to control operation of the plasma fuel reformer 12. In particular, the electronic control unit 16 executes a routine including, amongst other things, a closed-loop control scheme in which the electronic control unit 16 monitors outputs of the sensors associated with the plasma fuel reformer 12 in order to control the inputs to the electronically-controlled components associated therewith. To do so, the electronic control unit 16 communicates with the sensors associated with the fuel reformer in order to determine, amongst numerous other things, the amount and/or pressure of air and/or fuel being supplied to the plasma fuel reformer 12, the amount of oxygen in the reformate gas, the amount of soot accumulated within the plasma reformer 12, and the composition of the reformate gas. Armed with this data, the electronic control unit 16 performs numerous calculations each second, including looking up values in preprogrammed tables, in order to execute algorithms to perform such functions as determining when to purge the soot accumulated in the fuel reformer, determining when or how long the fuel reformer's fuel injector or other fuel input device is opened, controlling the power level input to the fuel reformer, controlling the amount of air advanced through air inlet valve, etcetera.

In an exemplary embodiment, the aforedescribed control scheme includes a routine for purging the accumulated soot from the reaction chamber 50 of the plasma fuel reformer 12. One way to purge the accumulated soot particulates is by combusting or otherwise oxidizing the accumulated soot by introducing oxygen into the reaction chamber 50. In particular, despite the relatively high temperatures (e.g., 800° C.–1200° C.) present in the reaction chamber 50 during operation of the plasma fuel reformer 12, the reaction chamber 50 is substantially devoid of oxygen. As such, despite the presence of significant amounts of heat, soot particulates accumulated in the reaction chamber 50 are not oxidized (i.e., burned) during performance of the fuel reforming process since sufficient amounts of oxygen are not present. However, once oxygen is introduced into the reaction chamber 50, the soot particulates readily oxidize (i.e., burn). Hence, the control scheme of the present disclosure includes a routine for selectively introducing oxygen into the plasma fuel reformer 12 thereby temporarily increasing the oxygen concentration in the reaction chamber 50 so as to oxidize the soot particulates accumulated therein. The duration of such a pulse of oxygen may be configured to ensure that all (or substantially all) of the accumulated soot particulates have been purged, after which time fuel may be reintroduced into plasma fuel reformer in order to resume the fuel reforming process.

In order to provide for such selective introduction of oxygen into the plasma fuel reformer 12, the control scheme of the present disclosure includes a routine for selectively increasing the air-to-fuel ratio of the air/fuel mixture being processed by the plasma fuel reformer 12. In particular, during the fuel reforming process, the plasma fuel reformer 12 processes an air/fuel mixture having an air-to-fuel ratio which coincides with a desired oxygen-to-carbon (O/C) ratio. This oxygen-to-carbon ratio may be, for example, 1.0–1.6. However, as mentioned above, soot particulates may accumulate within plasma fuel reformer 12 under such operating conditions. In order to purge the soot particulates from plasma fuel reformer 12, the air-to-fuel ratio of the air/fuel mixture supplied to plasma fuel reformer 12 is increased by an amount sufficient to oxidize (i.e., ignite and burn) the soot. In particular, the control routine executed by the control unit 16 includes a scheme for temporarily increasing the air-to-fuel ratio of the air/fuel mixture processed by the plasma fuel reformer 12.

In general, therefore, an air/fuel mixture having a desired amount of both air and fuel is advanced into the plasma fuel reformer 12 during normal operating conditions (i.e. during performance of the fuel reforming process). During such operation, the control unit 16 determines whether a soot purge is to be performed. If control unit 16 does, in fact, determine that a soot purge is to be performed, control unit 16 communicates with the air/fuel input assemlby 15 so as to cause a second air/fuel mixture that is devoid (or substantially devoid) of fuel to be advanced into the plasma fuel reformer 12 thereby purging (e.g. oxidizing) soot therein.

One exemplary way to determine whether a soot purge is to be performed is by monitoring the amount of soot particulates accumulating within the plasma fuel reformer 12 through the use of soot sensor 34 described above. Soot sensor 34 generates an output signal indicative of the amount of soot within the reformer. The control unit 16 monitors the output of the soot sensor 34 to determine when the amount of soot accumulated in the reformer reaches a predetermined accumulation level or "set point" amount of soot (S). If the sensed amount of soot exceeds the set point amount of soot (S), the control unit 16 causes the air-to-fuel ratio of the air/fuel mixture to increase by increasing the flow of air through valve 40 and/or by decreasing the amount of fuel to enter plasma-generating assembly 42 through fuel injector 38. In other words, in response to the output from the soot sensor 34, an air/fuel mixture having an air-to-fuel ratio larger than the air-to-fuel ratio of the air/fuel mixture utilized in the reforming process is advanced into plasma reformer 12 to purge the soot therein. In an exemplary embodiment, the air/fuel mixture introduced into the plasma fuel reformer 12 to purge soot is devoid (or substantially devoid) of fuel.

In order to produce such an air/fuel mixture (i.e., a mixture that is devoid or substantially devoid of fuel) the fuel injector 38 may be "shut off" to prevent any fuel from entering plasma-generating assembly 42. In such a situation, a pulse of air only is injected into the assembly 42 to ignite and burn any accumulated soot particles. The exemplary duration of such a pulse of air is relatively short, such as approximately 2–30 seconds, for example. In other words, the increased air-to-fuel ratio is maintained only long enough to sufficiently burn the accumulated soot particulates. It is within the scope of this disclosure, however, for fuel reformer 14 to process the air/fuel mixture having an increased air-to-fuel ratio for longer or shorter periods of time if desired. Once the soot particulates have been sufficiently purged, an air/fuel mixture having a desired air-to-fuel ratio for performance of the fuel reforming process is reintroduced into the plasma fuel reformer 12.

Figure 3:
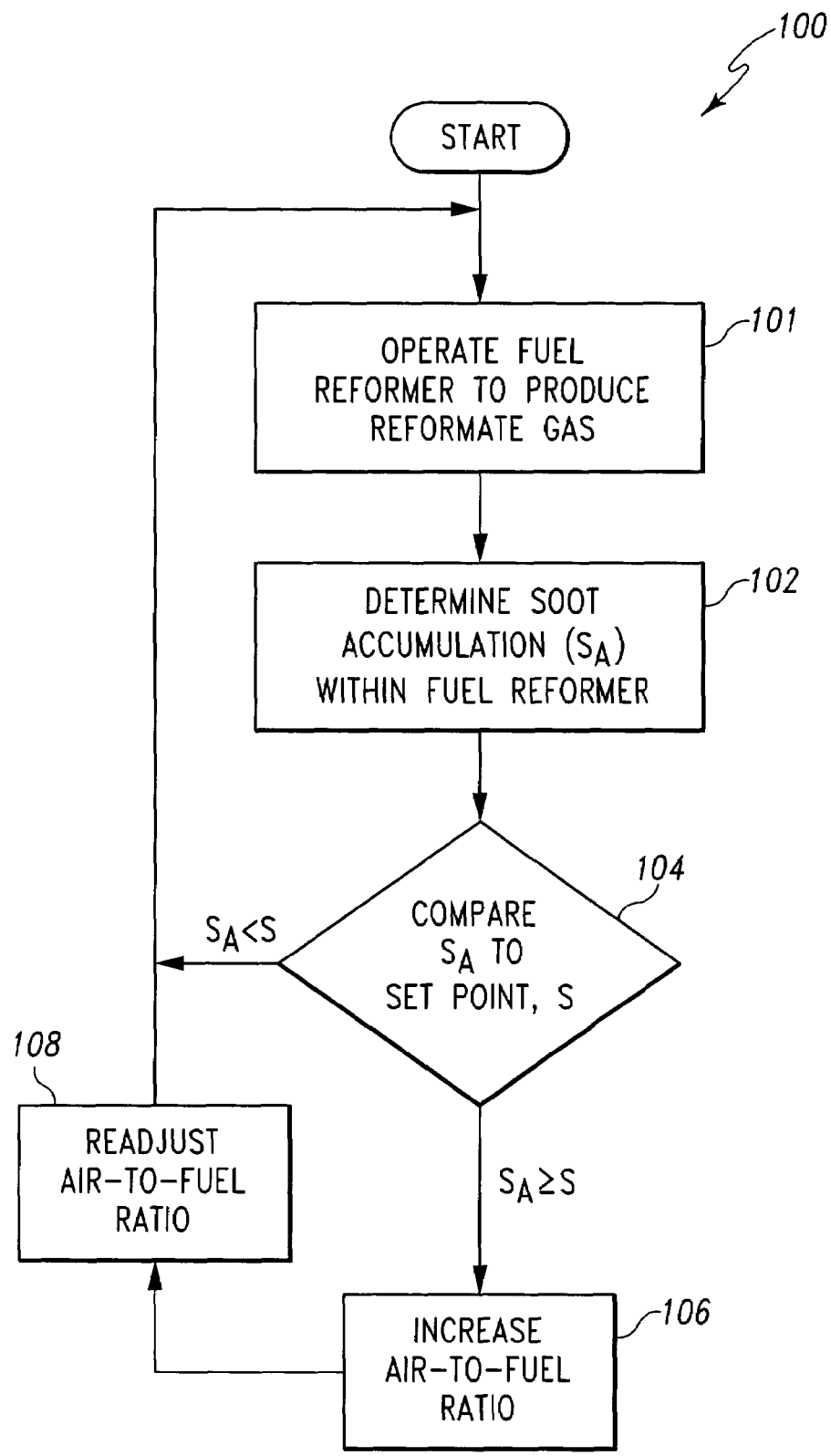
FIG. 3 is a flowchart of a control procedure executed by the control unit during operation of the fuel reforming assembly of FIG. 1.

Referring now to FIG. 3, there is shown a control routine 100 for purging soot from the plasma fuel reformer 12 during operation thereof. As shown in FIG. 3, the routine 100 begins with step 101 in which the plasma fuel reformer 12 is being operated under the control of the electronic control unit 16 so as to produce reformate gas which may be supplied to, for example, the intake of an internal combustion engine (not shown), and emission abatement device (not shown), or a fuel cell (not shown). During such operation of the plasma fuel reformer 12, the electronic control unit 16, at step 102, determines the amount of soot particulates which are present or have accumulated within the fuel reformer 12 ($S_A$). In particular, the control unit 16 scans or otherwise reads the signal line 18 in order to monitor output from the soot sensor 34. The output signals produced by the soot sensor 34 are indicative of the amount of soot ($S_A$) within plasma reformer 12. Once the control unit 16 has determined the amount of accumulated soot ($S_A$) within plasma reformer 12, the control routine 100 advances to step 104.

In step 104, the control unit 16 compares the sensed amount of soot ($S_A$) within the plasma reformer 12 to a set point soot accumulation value (S). In particular, as described herein, a predetermined soot accumulation value, or set point, may be established which corresponds to a particular amount of soot particulate accumulation within plasma reformer 12. As such, in step 104, the control unit 16 compares the actual soot accumulation ($S_A$) within the plasma reformer 12 to the set point soot accumulation value (S). If the soot accumulation ($S_A$) within the plasma reformer 12 is less than the set point soot content (S), the control routine 100 loops back to step 101 to continue monitoring the output from the soot sensor 34. However, if the soot accumulation ($S_A$) within plasma reformer 12 is equal to or greater than the set point soot accumulation value (S), a control signal is generated, and the control routine 100 advances to step 106.

In step 106, the amount of oxygen in the reaction chamber 50 is increased. To do so, the control unit 16 increases the air-to-fuel ratio of the air/fuel mixture being processed by the plasma fuel reformer 12. As mentioned above, this may be accomplished by either adjusting fuel flow (as controlled by the fuel injector 38) or by adjusting the air flow (as controlled by the air inlet valve 40), or both. In particular, the control unit 16 may generate a control signal on the signal line 20 thereby adjusting the amount of fuel that fuel injector 38 injects into plasma-generating assembly 42 and/or control unit 16 may generate a control signal on the signal line 22 thereby adjusting the position of the inlet air valve 40 to increase the amount of air flowing into assembly 42. In the exemplary embodiment described herein, control unit 16 communicates with the air inlet valve 40 and the fuel injector 38 to introduce an air/fuel mixture that is devoid (or substantially devoid) of fuel into the plasma fuel reformer 12. To do so, the control unit 16 ceases operation of the fuel injector 38 thereby preventing additional fuel from being introduced into the plasma reformer 12. Contemporaneously, the control unit 16 operates the air inlet valve 40 so as to introduce a desired amount of air into the plasma fuel reformer 12. As a result, oxygen is introduced into the reaction chamber 50 thereby facilitating oxidation (i.e., burning) of the soot particulates accumulated therein.

Next, the control routine 100 advances to step 108. In step 108, the control unit 16 readjusts the fuel flow and/or the air flow so that an air/fuel mixture having a desired air-to-fuel ratio for performance of the fuel reforming process is reintroduced into the plasma fuel reformer 12. Thereafter, the control routine loops back to step 102 to continue monitoring the output from the soot sensor 34.

Figure 4:
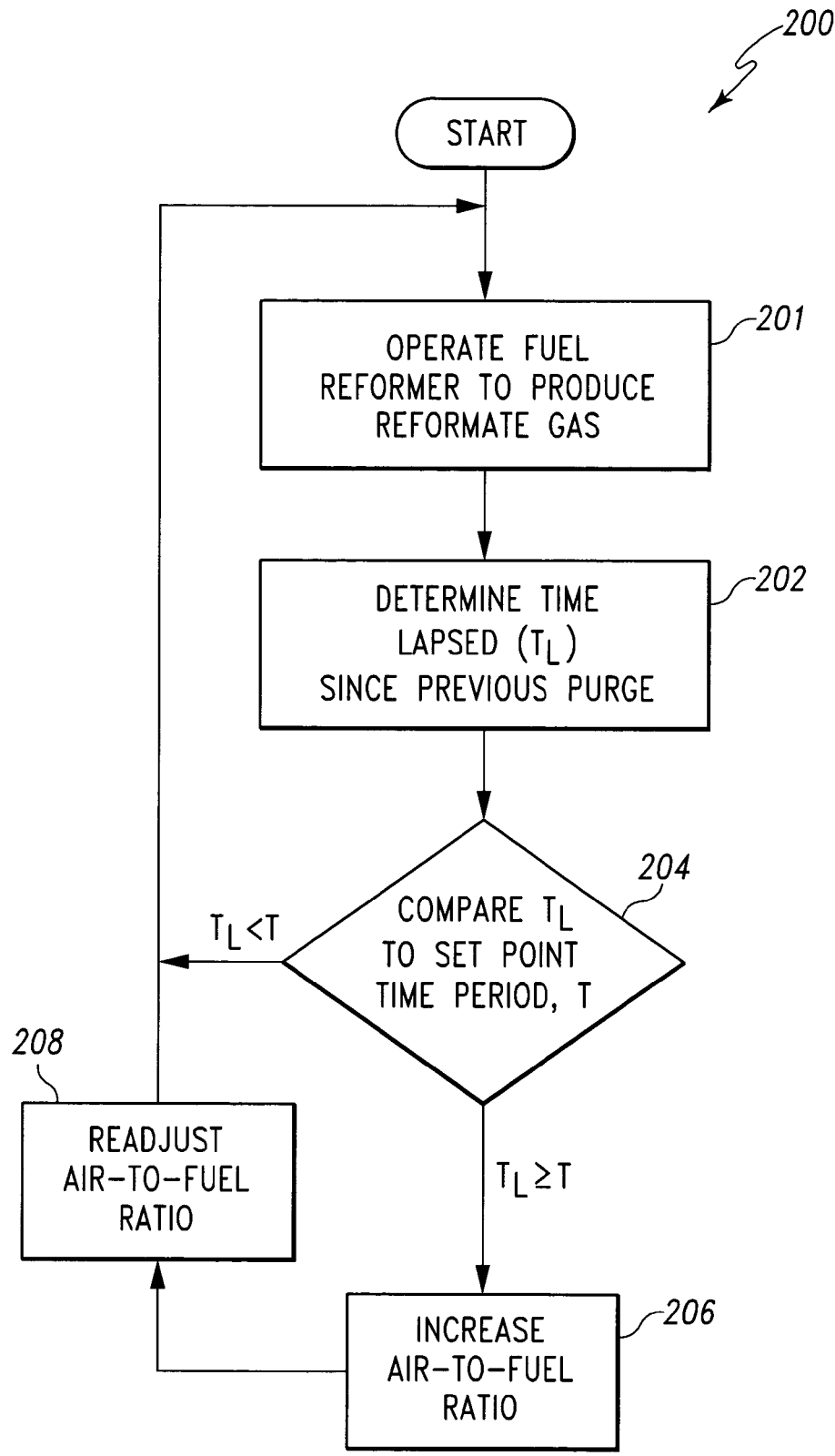
FIG. 4 is a flowchart of an alternative control procedure which also may be executed by the control unit during operation of the fuel reforming assembly of FIG. 1.

In another illustrative control scheme, the soot particulates accumulated within fuel reformer 14 are regularly purged at predetermined time intervals, as opposed to by use of the soot sensor 34. In such a scheme, therefore, a soot sensor is not necessary, although one may be included, if desired. Referring now to FIG. 4, for example, an alternative control routine 200 for operation of control unit 16 to purge soot particulates from plasma reformer 12 at predetermined intervals is shown. Similar to control routine 100, control routine 200 selectively purges soot by control of the air-to-fuel ratio of the air/fuel mixtures being processed by the plasma fuel reformer 12 during operation thereof. However, as discussed below, control routine 200 operates to increase the air-to-fuel ratio to purge the soot accumulated within plasma reformer 12 at predetermined time intervals, rather than in response to output from a soot sensor.

As shown in FIG. 4, routine 200 begins with step 201 in which the plasma fuel reformer 12 is being operated under the control of the electronic control unit 16 so as to produce reformate gas which may be supplied to, for example, the intake of an internal combustion engine (not shown), and emission abatement device (not shown), or a fuel cell (not shown). During such operation of the plasma fuel reformer 12, the electronic control unit 16, at step 202 determines the time which has lapsed ($T_L$) since soot was last purged from the plasma reformer 12. Once the control unit 16 has determined the time which has lapsed ($T_L$) the control routine 200 advances to step 204. In step 204, the control unit 16 compares the time which has lapsed ($T_L$) to a set point time period (T). In particular, as described herein, a predetermined time period between soot-purging cycles (T) may be established as desired. In the exemplary embodiment described herein, for example, set point time period (T) is between approximately 8–10 hours of operation.

If the amount of time that has lapsed ($T_L$) since the last purge cycle is less than the set point time period (T), the control routine 200 loops back to step 201 to continue operation of the plasma fuel reformer 12. However, if the amount of time that has lapsed since the last purge cycle ($T_L$) is greater than or equal to the set point time period (T), the control routine 200 generates a control signal and then advances to step 206. It is within the scope of this disclosure for control unit 16 to determine the amount of time which has lapsed since the last purge cycle as measured from any step or reference point within control routine 200. For example, the amount of lapsed time may be the time which has lapsed since the air-to-fuel ratio was increased or from when it was returned to its pre-purge cycle level.

In step 206, the amount of oxygen in the reaction chamber 50 is increased. To do so, the control unit 16 increases the air-to-fuel ratio of the air/fuel mixture being processed by the plasma fuel reformer 12. As mentioned above, control unit 16 may generate a control signal on the signal line 20 to adjust the amount of fuel that fuel injector 38 injects into plasma-generating assembly 42 and/or control unit 16 may generate a control signal on the signal line 22 thereby adjusting the position of the inlet air valve to increase the amount of air flowing into assembly 42. In the exemplary embodiment described herein, control unit 16 communicates with the air inlet valve 40 and the fuel injector 38 to introduce an air/furl mixture that is devoid (or substantially devoid) of fuel into the plasma fuel reformer 12. To do so, the control unit 16 ceases operation of the fuel injector 38 thereby preventing additional fuel from being introduced into the reformer 12. Contemporaneously, the control unit 16 operates the air inlet valve 40 so as to introduce a desired amount of air into the plasma fuel reformer 12. As a result, oxygen is introduced into the reaction chamber 50 thereby facilitating oxidation (i.e., burning) of the soot particulates accumulated therein.

Next, the control routine 200 advances to step 208 where the control unit 16 readjusts the fuel flow and/or the air flow so that an air/fuel mixture having a desired air-to-fuel ratio for performance of the fuel reforming process is reintroduced into the plasma fuel reformer 12. Thereafter, the control routine 200 loops back to step 201 to continue monitoring the time lapsed ($T_L$) since the last soot purge cycle.

In yet another control scheme, the control unit 16 increases the air-to-fuel ratio to purge the soot particulates from plasma reformer 12 during shutdown of the plasma fuel reformer 12. In particular, upon detection of a request to shut down the plasma reformer 12, control unit 16 operates to increase the air-to-fuel ratio in response thereto for a sufficient time to purge the soot particulates from within the plasma reformer 12. Thereafter, the plasma reformer 12 is shut down and ceases to operate. In other words, soot is purged from the plasma reformer 12 when the fuel reformer 12 is shut down. Such shutdown may also be linked to a shut down of the system in which the plasma fuel reformer 12 is utilized. For example, if the plasma fuel reformer 12 is part of an engine system, the purge cycle may be triggered by shutdown of the engine.

In still another illustrative control scheme, the control unit 16 increases the air-to-fuel ratio to purge the soot particulates from plasma reformer 12 during high engine load conditions such as during vehicle acceleration. In particular, in certain vehicle or power generator system designs, the plasma fuel reformer 12 may not be operated during high engine load conditions. Therefore, a soot-purging cycle during high engine load conditions would not disrupt the normal operations of the plasma fuel reformer 12. To detect such high load conditions, control signals from various engine components are monitored by control unit 16. Upon detection of a high load condition, control unit 16 initiates the soot-purging cycle by increasing the air-to-fuel ratio of the air/fuel mixture processed by plasma fuel reformer 12 in any manner discussed above.

As described above, control unit 16 increases the air-to-fuel ratio of the air/fuel mixture processed by plasma fuel reformer 12 in response to various signals and/or events, such as output from a soot sensor, predetermined time intervals, during a shutdown sequence, or at high load engine conditions, for example. However, it is within the scope of this disclosure for control unit 16 to increase the air-to-fuel ratio in response to various other signals and/or conditions in order to purge soot particulate accumulations from within plasma fuel reformer 12.

Figure 5:
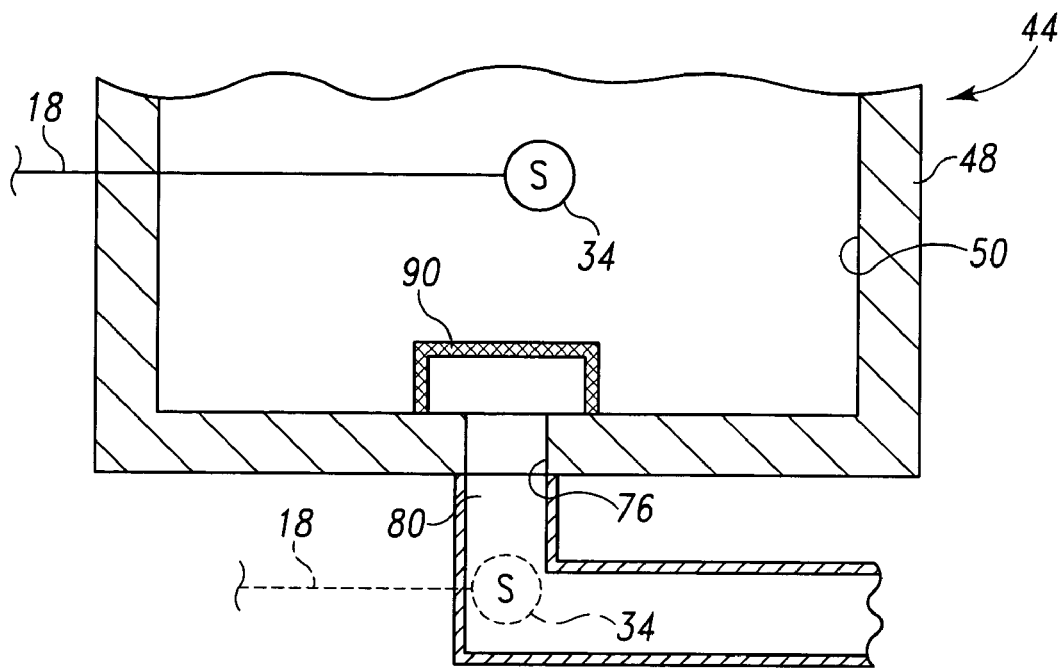
FIG. 5 is a fragmentary diagrammatic cross sectional view showing a soot trap positioned within the plasma fuel reformer.
Figure 6:
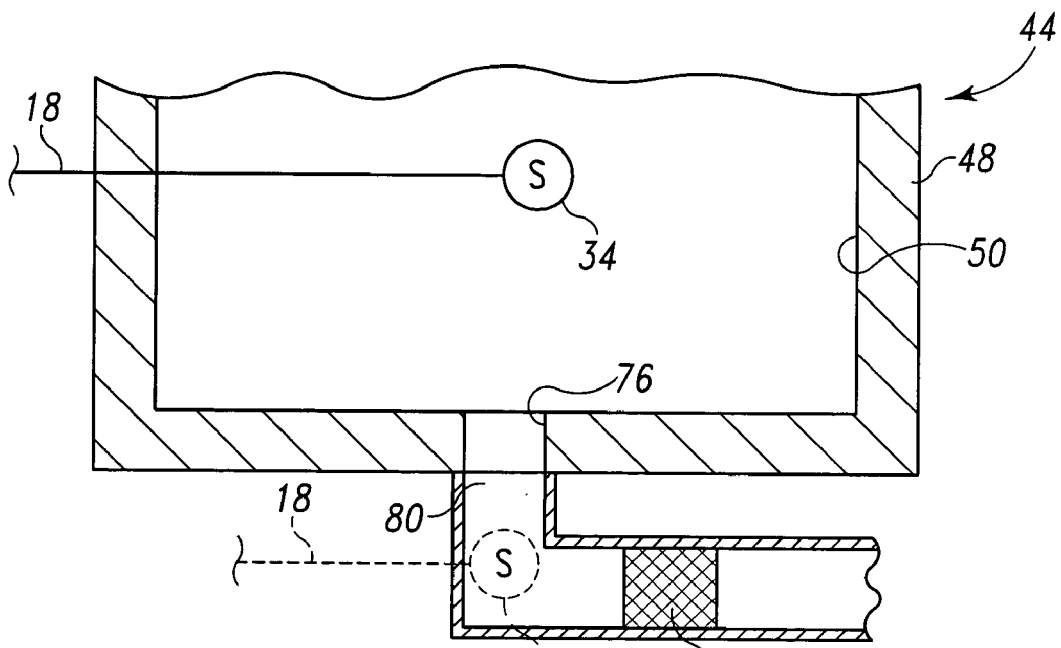
FIG. 6 is a fragmentary diagrammatic cross sectional view showing a soot trap positioned within a conduit fluidly coupled to the fuel reformer.

Referring now to FIG. 5, there is shown a soot trap 90 for use with the fuel reformer 12 to trap or otherwise remove and collect soot from the reformate gas generated by the fuel reformer 12. The soot trap 90 covers the outlet 76. In particular, the soot trap 90 is positioned upstream of the outlet 76 within the reactor housing 48 such that reformate gas exiting the fuel reformer 12 passes through the soot trap 90. However, as shown in FIG. 6, the soot trap 90 may also be positioned within the conduit 80 at a position downstream of the outlet 76 such that reformats gas having exited the fuel reformer 12 passes through the soot trap 90. It should be appreciated that a soot trap may be positioned in both locations to fit the needs of a given fuel reformer design (i.e., a first trap may be positioned in the reformer and a second trap positioned in the conduit).

Use of the soot trap 90 is particularly useful in the case of when the fuel reformer 12 is embodied without the catalyst 78 in the reaction chamber 50. However, the soot trap may be used in conjunction with such a catalyst. However, as used herein, the term "soot trap" and "catalyst" are intended to mean different structures. In other words, even though the catalyst 78 may collect a number of soot particles by the nature of its physical structure, a "soot trap" according to the present disclosure, and as used in the appended claims, is intended to cover structures which are distinct from the catalyst structures which function to catalyze the reactions associated with the fuel reforming process.

The soot trap 90 may be embodied as any type of filter such as known particulate filter including "deep bed" or "wall flow" filters. Deep bed filters may be embodied as metallic mesh filters, metallic or ceramic foam filters, ceramic fiber mesh filters, and the like. Wall flow filters, on the other hand, may be embodied as a cordierite or silicon carbide ceramic filter with alternating channels plugged at the front and rear of the filter thereby forcing the gas advancing therethrough into one channel, through the walls, and out another channel. The soot trap 90 may also be embodied as a wire mesh screen for trapping soot thereon.

During operation of the fuel reformer 12, soot accumulates on the soot trap 90. At some point, it may be desirable to purge the soot accumulated in the soot trap 90. For example, the amount of soot within the soot trap 90 may reach a predetermined accumulation level. In such a case, the control unit 16 may execute a control routine 300 shown in FIG. 7 to purge soot from the soot trap 90. Alternatively, the control unit 16 may execute a control routine 400 shown in FIG. 8 to purge soot from the soot trap 90 at predetermined time intervals between soot purges. Both control routines 300, 400 are discussed in more detail herein.

Figure 7:
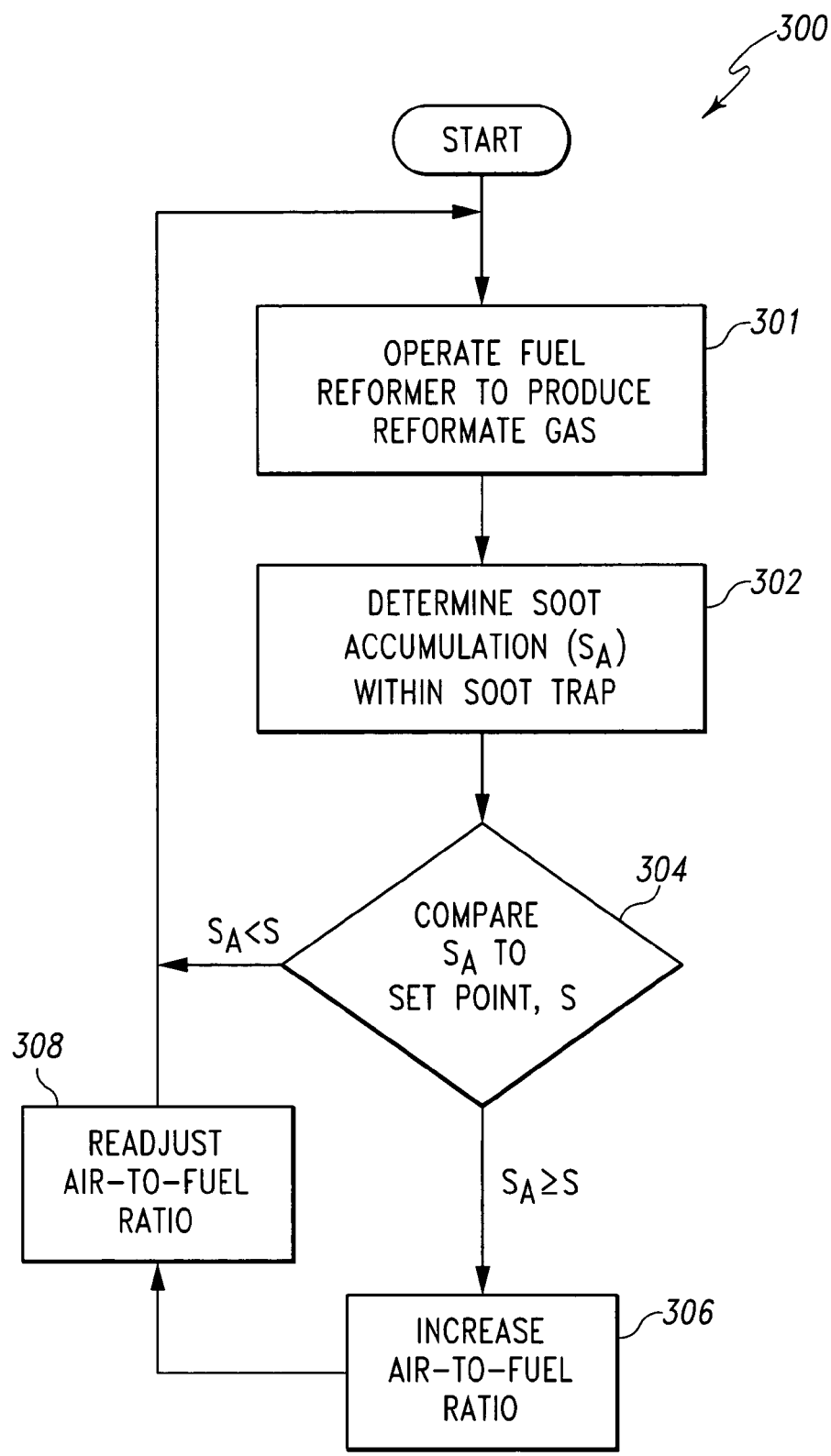
FIG. 7 is a flowchart of a purge soot control procedure.

Referring now to FIG. 7, there is shown the control routine 300 for purging soot from the soot trap 90 during operation of the fuel reformer 12. As shown in FIG. 7, the routine 300 begins with step 301 in which the plasma fuel reformer 12 is being operated under the control of the electronic control unit 16 so as to produce reformate gas which may be supplied to, for example, the intake of an internal combustion engine (not shown), an emission abatement device (not shown), or a fuel cell (not shown). During such operation of the plasma fuel reformer 12, the electronic control unit 16, at step 302, determines the amount of soot particulates which are present or have accumulated within the soot trap 90 ($S_A$). In particular, the control unit 16 scans or otherwise reads the signal line 18 in order to monitor output from the soot sensor 34 which is positioned, for example, within either the reactor housing 48 or the conduit 80. The soot sensor 34 may be positioned on or near the soot trap 90 or may even be incorporated into the soot trap 90. The output signals produced by the soot sensor 34 are indicative of the amount of soot ($S_A$) within the plasma reformer 12 and hence indicative of the amount of accumulated soot in the soot trap 90. Once the control unit 16 has determined the amount of accumulated soot ($S_A$), the control routine 300 advances to step 304.

In step 304, the control unit 16 compares the sensed amount of soot ($S_A$) within the soot trap 90 to a set point soot accumulation value (S). In particular, as described herein, a predetermined soot accumulation value, or set point, may be established which corresponds to a particular amount of soot particulate accumulation within the soot trap 90. As such, in step, 304, the control unit 16 compares the actual soot accumulation ($S_A$) within the soot trap 90 to the set point soot accumulation value (S). If the soot accumulation ($S_A$) within the soot trap 90 is less than the set point soot content (S), the control routine 300 loops back to step 301 to continue monitoring the output from the soot sensor 34. However, if the soot accumulation ($S_A$) within the soot trap 90 is equal to or greater than the set point soot accumulation value (S), a control signal is generated, and the control routine 300 advances to step 306.

In step 306, the amount of oxygen in the reaction chamber 50 is increased. To do so, the control unit 16 increases the air-to-fuel ratio of the air/fuel mixture being processed by the plasma fuel reformer 12. As mentioned above, this may be accomplished by either adjusting fuel flow (as controlled by the fuel injector 38) or by adjusting the air flow (as controlled by the air inlet valve 40), or both. In particular, the control unit 16 may generate a control signal on the signal line 20 thereby adjusting the amount of fuel that fuel injector 38 injects into plasma-generating assembly 42 and/or control unit 16 may generate a control signal on the signal line 22 thereby adjusting the position of the inlet air valve 40 to increase the amount of air flowing into assembly 42. In the exemplary embodiment described herein, control unit 16 communicates with the air inlet valve 40 and the fuel injector 38 to introduce an air/fuel mixture that is devoid (or substantially devoid) of fuel into the plasma fuel reformer 12. To do so, the control unit 16 ceases operation of the fuel injector 38 thereby preventing additional fuel from being introduced into the plasma reformer 12. Contemporaneously, the control unit 16 operates the air inlet valve 40 so as to introduce a desired amount of air into the plasma fuel reformer 12. As a result, oxygen is introduced into the reaction chamber 50 thereby facilitating oxidation (i.e., burning) of the soot particulates accumulated in the soot trap 90.

Next, the control routine 300 advances to step 308. In step 308, the control unit 16 readjusts the fuel flow and/or the air flow so that an air/fuel mixture having a desired air-to-fuel ratio for performance of the fuel reforming process is reintroduced into the plasma fuel reformer 12. Thereafter, the control routine loops back to step 302 to continue monitoring the output from the soot sensor 34.

Figure 8:
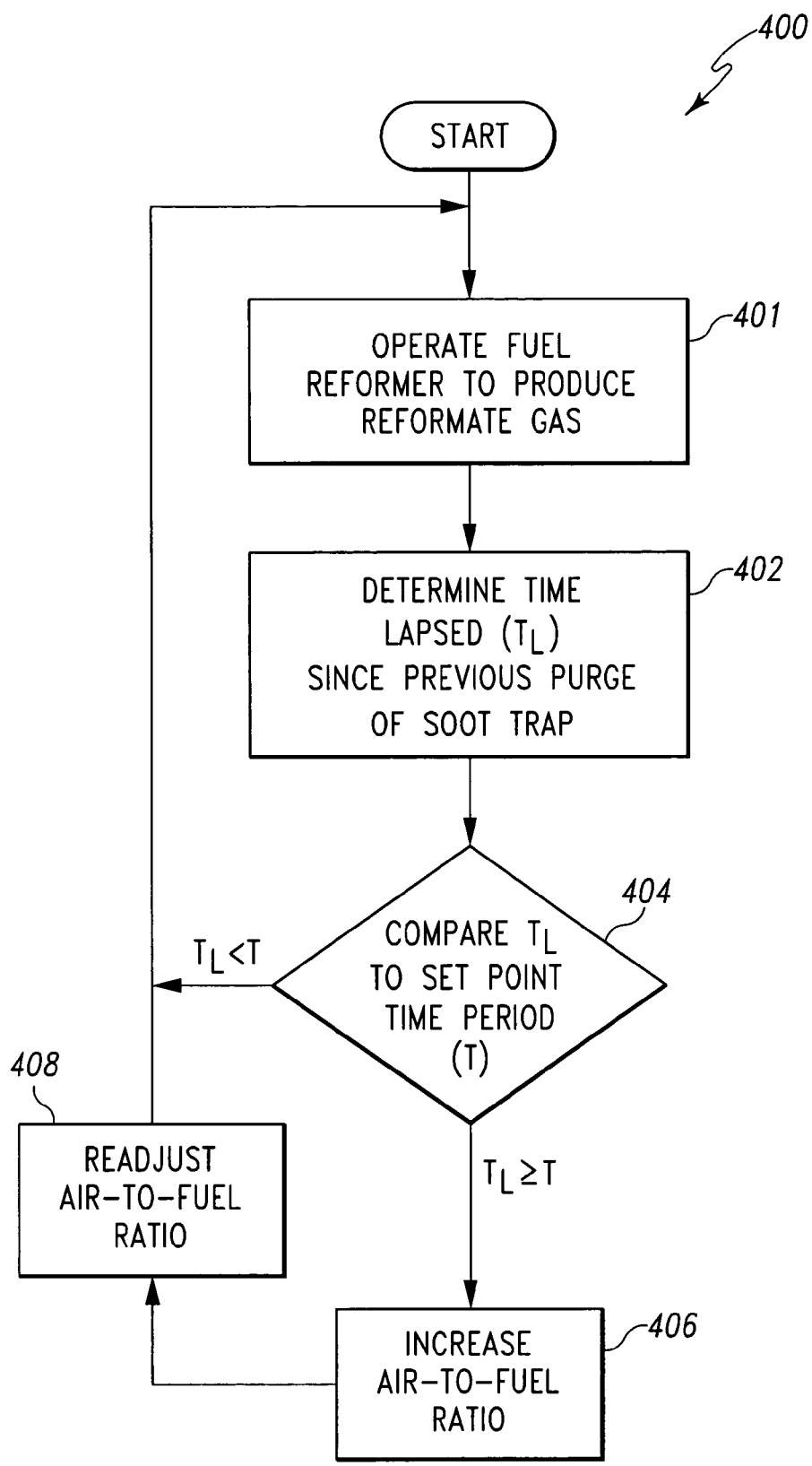
FIG. 8 is a flowchart of an alternative purge soot control procedure.

Referring now to FIG. 8, there is shown the control routine 400 for purging soot accumulated in the soot trap 90 at predetermined time intervals, as opposed to by use of the soot sensor 34. In such a scheme, therefore, a soot sensor is not necessary, although one may be included, if desired. Control routine 400 selectively purges soot by control of the air-to-fuel ratio of the air/fuel mixtures being processed by the plasma fuel reformer 12 during operation thereof. However, as discussed below, control routine 400 operates to increase the air-to-fuel ratio to purge the soot accumulated within the soot trap 90 at predetermined time intervals, rather than in response to output from a soot sensor.

Routine 400 begins with step 401 in which the plasma fuel reformer 12 is being operated under the control of the electronic control unit 16 so as to produce reformate gas which may be supplied to, for example, the intake of an internal combustion engine (not shown), and emission abatement device (not shown), or a fuel cell (not shown). During such operation of the plasma fuel reformer 12, the electronic control unit 16, at step 402 determines the time which has lapsed ($T_L$) since soot was last purged from the soot trap 90. Once the control unit 16 has determined the time which has lapsed ($T_L$) the control routine 400 advances to step 404. In step 404, the control unit 16 compares the time which has lapsed ($T_L$) to a set point time period (T). In particular, as described herein, a predetermined time period between soot-purging cycles (T) may be established as desired. In the exemplary embodiment described herein, set point time period (T) is between approximately 8–10 hours of operation.

If the amount of time that has lapsed ($T_L$) since the last purge cycle is less than the set point time period (T), the control routine 400 loops back to step 401 to continue operation of the plasma fuel reformer 12. However, if the amount of time that has lapsed since the last purge cycle ($T_L$) is greater than or equal to the set point time period (T), the control routine 400 generates a control signal and then advances to step 406. It is within the scope of this disclosure for control unit 16 to determine the amount of time which has lapsed since the last purge cycle as measured from any step or reference point within control routine 400. For example, the amount of lapsed time may be the time which has lapsed since the air-to-fuel ratio was increased or from when it was returned to its pre-purge cycle level.

In step 406, the amount of oxygen in the reaction chamber 50 is increased. To do so, the control unit 16 increases the air-to-fuel ratio of the air/fuel mixture being processed by the plasma fuel reformer 12. As mentioned above, control unit 16 may generate a control signal on the signal line 20 to adjust the amount of fuel that fuel injector 38 injects into plasma-generating assembly 42 and/or control unit 16 may generate a control signal on the signal line 22 thereby adjusting the position of the inlet air valve to increase the amount of air flowing into assembly 42. In the exemplary embodiment described herein, control unit 16 communicates with the air inlet valve 40 and the fuel injector 38 to introduce an air/fuel mixture that is devoid (or substantially devoid) of fuel into the plasma fuel reformer 12. To do so, the control unit 16 ceases operation of the fuel injector 38 thereby preventing additional fuel from being introduced into the reformer 12. Contemporaneously, the control unit 16 operates the air inlet valve 40 so as to introduce a desired amount of air into the plasma fuel reformer 12. As a result, oxygen is introduced into the reaction chamber 50 thereby facilitating oxidation (i.e., burning) of the soot particulates accumulated in the soot trap 90.

Next, the control routine 400 advances to step 408 where the control unit 16 readjusts the fuel flow and/or the air flow so that an air/fuel mixture having a desired air-to-fuel ratio for performance of the fuel reforming process is reintroduced into the plasma fuel reformer 12. Thereafter, the control routine 400 loops back to step 401 to continue monitoring the time lapsed ($T_L$) since the last soot purge cycle.

Figure 9:
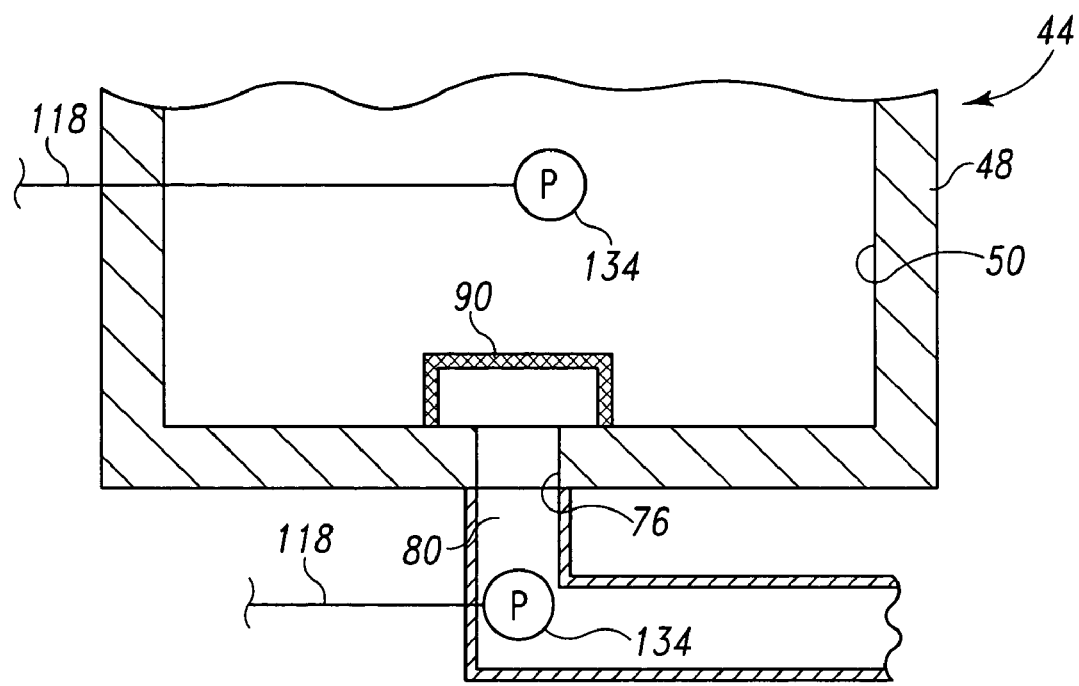
FIGS. 9 and 10 are views similar to FIGS. 5 and 6, respectively, but showing the use of a pair of pressure sensors.
Figure 10:
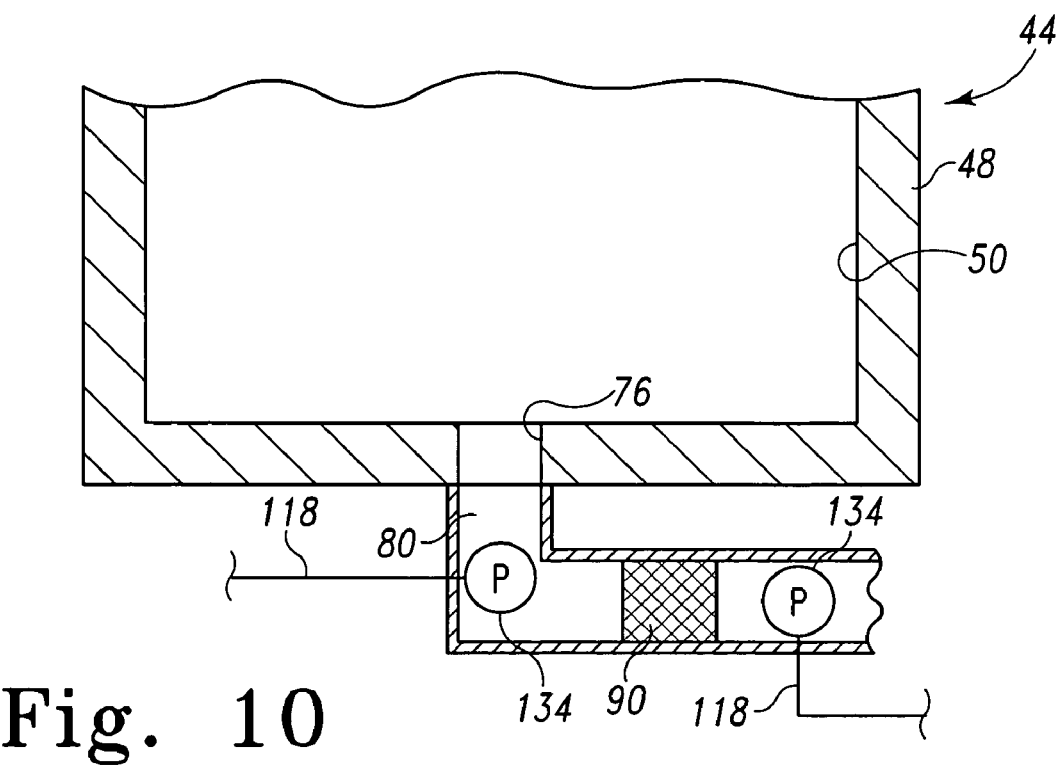

Referring now to FIGS. 9 and 10, a control scheme may also be implemented using a pair of pressure sensors 134 each of which is electrically coupled to the control unit 16 via a signal line 118. As shown in FIGS. 9 and 10, a first pressure sensor 134 is positioned upstream of the soot trap 90 with a second pressure sensor 134 being positioned downstream of the soot trap 90. The pressure sensors 134 sense or measure the pressure on each side of the soot trap 90 and thus determine the pressure difference between the two sensors 134 thereby obtaining the pressure drop across the soot trap 90. The pressure drop across the soot trap 90 is indicative of the amount of soot which has accumulated on the substrate. Therefore, as the amount of trapped soot particulates increases, the pressure difference between the two sensors 134 increases as well. Once the pressure difference between the two sensors reaches a certain predetermined level, for example, the control unit 16 may commence a purge cycle.

It should be appreciated that while shown in FIGS. 9 and 10 as utilizing two pressure sensors 134, a single pressure sensor 134 on either side of the soot trap 90 may be utilized, if desired. In such a configuration, the control unit 16 would monitor when the pressure sensed by the single pressure sensor 134 exceeded a predetermined upper threshold or was below a predetermined lower threshold, as opposed to monitoring the pressure drop across the soot trap 90.

Figure 11:
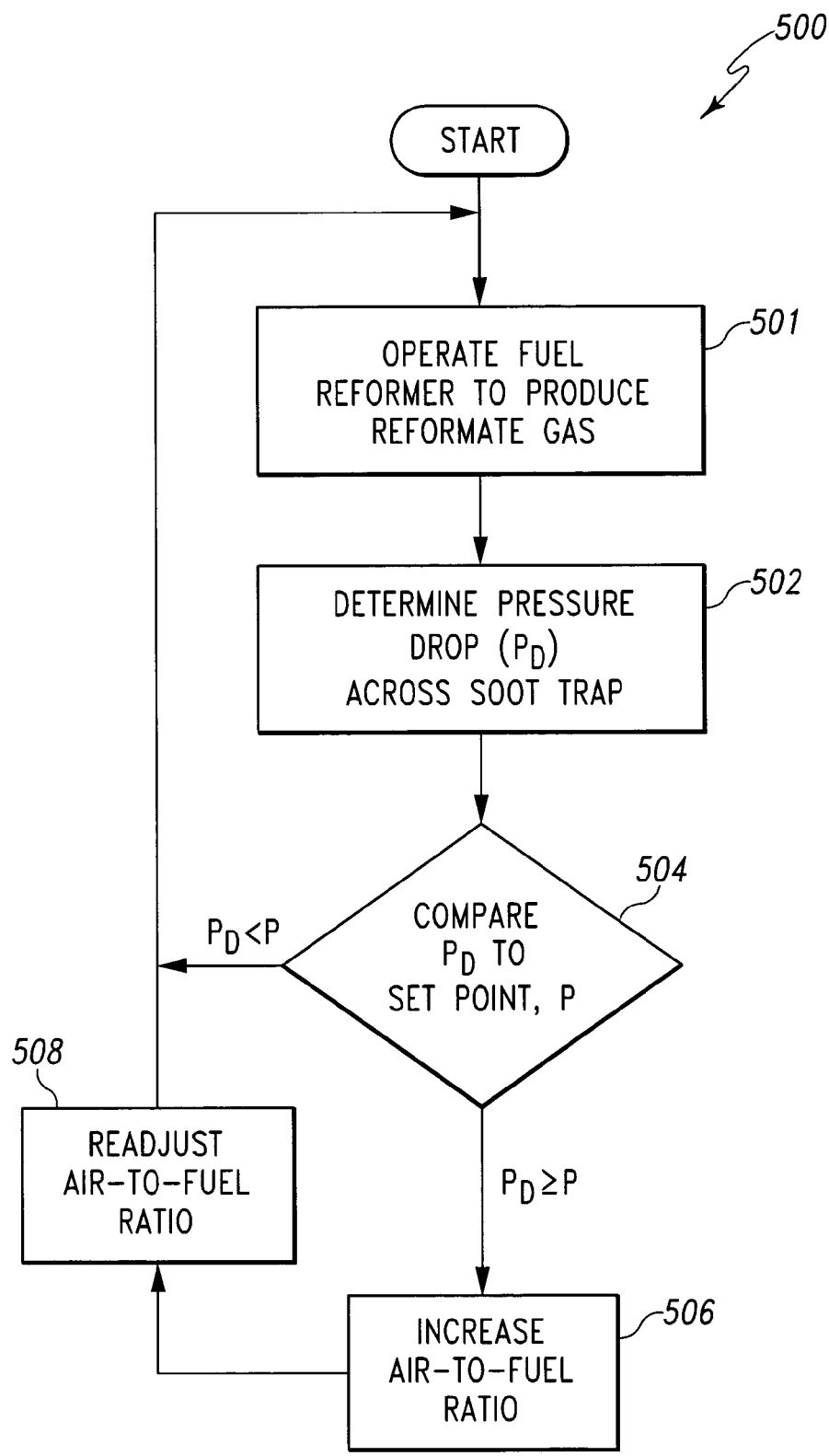
FIG. 11 is a flowchart of another purge soot control procedure.

A control routine 500 for purging soot from the soot trap 90 which utilizes the pressure sensors 134 is shown in FIG. 11. As shown in FIG. 11, the routine 500 begins with step 501 in which the plasma fuel reformer 12 is being operated under the control of the electronic control unit 16 so as to produce reformate gas which may be supplied to, for example, the intake of an internal combustion engine (not shown), an emission abatement device (not shown), or a fuel cell (not shown). During such operation of the plasma fuel reformer 12, the electronic control unit 16, at step 502, determines the pressure drop across the soot trap 90 ($P_D$). In particular, the control unit 16 scans or otherwise reads the signal lines 118 in order to monitor output from the pressure sensors 134. As described above, the pressure difference between the two sensors 134 is indicative of the pressure drop across the soot trap 90 which is an indicator of the amount of soot accumulated in the soot trap 90. Once the control unit 16 has determined the pressure drop across the soot trap ($P_D$), the control routine 500 advances to step 504.

In step 504, the control unit 16 compares the sensed pressure drop across the soot trap 90 ($P_D$) to a set point pressure drop value (P). In particular, as described herein, a predetermined pressure drop value, or set point, may be established which corresponds to a pressure drop generated by a particular amount of soot particulate being accumulated within the soot trap 90. As such, in step, 504, the control unit 16 compares the actual pressure drop across the soot trap 90 ($P_D$) to the set point pressure drop value (P). If the actual pressure drop across the soot trap 90 ($P_D$) is less than the set point pressure drop value (P), the control routine 500 loops back to step 501 to continue monitoring the output from the pressure sensors 134. However, if the actual pressure drop across the soot trap 90 ($P_D$) is equal to or greater than the set point pressure drop value (P), a control signal is generated, and the control routine 500 advances to step 506.

In step 506, the amount of oxygen in the reaction chamber 50 is increased. To do so, the control unit 16 increases the air-to-fuel ratio of the air/fuel mixture being processed by the plasma fuel reformer 12. As mentioned above, this may be accomplished by either adjusting fuel flow (as controlled by the fuel injector 38) or by adjusting the air flow (as controlled by the air inlet valve 40), or both. In particular, the control unit 16 may generate a control signal on the signal line 20 thereby adjusting the amount of fuel that fuel injector 38 injects into plasma-generating assembly 42 and/or control unit 16 may generate a control signal on the signal line 22 thereby adjusting the position of the inlet air valve 40 to increase the amount of air flowing into assembly 42. In the exemplary embodiment described herein, the control unit 16 communicates with the air inlet valve 40 and the fuel injector 38 to introduce an air/fuel mixture that is devoid (or substantially devoid) of fuel into the plasma fuel reformer 12. To do so, the control unit 16 ceases operation of the fuel injector 38 thereby preventing additional fuel from being introduced into the plasma reformer 12. Contemporaneously, the control unit 16 operates the air inlet valve 40 so as to introduce a desired amount of air into the plasma fuel reformer 12. As a result, oxygen is introduced into the reaction chamber 50 thereby facilitating oxidation (i.e., burning) of the soot particulates accumulated in the soot trap 90.

Next, the control routine 500 advances to step 508. In step 508, the control unit 16 readjusts the fuel flow and/or the air flow so that an air/fuel mixture having a desired air-to-fuel ratio for performance of the fuel reforming process is reintroduced into the plasma fuel reformer 12. Thereafter, the control routine 500 loops back to step 502 to continue monitoring the output from the pressure sensors 134.

In yet another control scheme, the control unit 16 increases the air-to-fuel ratio to purge the soot particulates from the soot trap 90 during shutdown of the plasma fuel reformer 12. In particular, upon detection of a request to shut down the plasma reformer 12, control unit 16 operates to increase the air-to-fuel ratio in response thereto for a sufficient time to purge the soot particulates from the soot trap 90. Thereafter, the plasma reformer 12 is shut down and ceases to operate. In other words, soot is purged from the soot trap 90 when the fuel reformer 12 is being shut down. Such shutdown may also be linked to a shut down of the system in which the plasma fuel reformer 12 is utilized. For example, if the plasma fuel reformer 12 is part of an engine system, the purge cycle may be triggered by shutdown of the engine.

In still another illustrative control scheme, the control unit 16 increases the air-to-fuel ratio to purge the soot particulates from the soot trap 90 during high engine load conditions such as during vehicle acceleration. In particular, in certain vehicle or power generator system designs, the plasma fuel reformer 12 may not be operated during high engine load conditions. Therefore, a soot-purging cycle during high engine load conditions would not disrupt the normal operations of the plasma fuel reformer 12. To detect such high load conditions, control signals from various engine components are monitored by control unit 16. Upon detection of a high load condition, control unit 16 initiates the soot-purging cycle by increasing the air-to-fuel ratio of the air/fuel mixture processed by plasma fuel reformer 12 in any manner discussed above.

As described above, control unit 16 increases the air-to-fuel ratio of the air/fuel mixture processed by plasma fuel reformer 12 in response to various signals and/or events, such as, for example, output from a soot or pressure sensor, predetermined time intervals, during a shutdown sequence, or at high load engine conditions to purge soot from the soot trap 90. However, it is within the scope of this disclosure for control unit 16 to increase the air-to-fuel ratio in response to various other signals and/or conditions in order to purge soot particulate accumulations from the soot trap 90.

While the concepts of the present disclosure have been illustrated and described in detail in the drawings and foregoing description, such an illustration and description is to be considered as exemplary and not restrictive in character, it being understood that only the illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

For example, the air-to-fuel ratio of the air/fuel mixture processed by the plasma fuel reformer 12 during performance of the fuel reforming process may be adjusted based on soot accumulation. In particular, as described herein, a first or primary air/fuel mixture is processed by the plasma fuel reformer to produce reformate gas with a second air/fuel mixture (e.g., a pulse of air which is devoid of fuel) being introduced into the fuel reformer when it is deemed necessary to purge the reformer of soot. In practice, the introduction of the primary air/fuel mixture is dynamic in nature with the air-to-fuel ratio thereof being dynamically adjusted within a predetermined range. A number of variables may be used to create a closed loop feedback mechanism which allows for such adjustment of the primary air/fuel ratio based on a wide variety factors. One such variable which may be used in the creation of such a closed loop feedback mechanism is soot accumulation within the plasma fuel reformer 12. In particular, the soot accumulation level within the reformer may be sensed or otherwise determined by use of the concepts described herein with the results of which being utilized as part of the closed loop feedback mechanism being employed by the reformer to control the primary air/fuel mixture during reformate gas production. In one exemplary implementation of this concept, the air-to-fuel ratio of the primary air/fuel mixture may be controlled by monitoring the rate of soot production by the plasma fuel reformer 12.

As a further example, it should be appreciated that it may be desirable to momentarily de-actuate (i.e., turn off) the plasma-generating assembly 42 such that the plasma arc 62 is not generated during introduction of an air/fuel mixture which is devoid or substantially devoid of fuel (i.e., during the purging of soot from the reformer). By doing so, the formation of certain undesirable species (e.g., $NO_x$) may be avoided by preventing the plasma arc 62 from interacting with the injected air. In such a case, the control routines described herein may be modified to de-actuate the plasma-generating assembly during purging of soot from the reformer 12, and then re-actuate the plasma-generating assembly when the reformer 12 resumes the fuel reforming process.

The invention claimed is:

1. A plasma fuel reformer assembly for producing reformate gas, the fuel reformer assembly comprising:

a plasma fuel reformer having (i) an air/fuel input assembly, (ii) an electrode assembly comprising a first electrode and a second electrode that is spaced apart from the first electrode, (iii) a soot trap positioned downstream of the electrode assembly, and (iv) an outlet, a conduit fluidly coupling the outlet of the plasma fuel reformer to one of an emission abatement device and an intake of an internal combustion engine, wherein the soot trap is positioned to filter reformate gas produced by the plasma fuel reformer assembly prior to the reformate gas exiting the conduit, and a reformer controller electrically coupled to the air/fuel input assembly, the controller comprising (i) a processing unit, and (ii) a memory unit electrically coupled to the processing unit, the memory unit having stored therein a plurality of instructions which, when executed by the processing unit, causes the processing unit to:

operate the air/fuel input assembly so as to advance a first air/fuel mixture with a first air-to-fuel ratio into the plasma fuel reformer, determine if a soot purge of the soot trap of the plasma fuel reformer is to be performed and generate a purge-soot signal in response thereto, and operate the air/fuel input assembly so as to advance a second air/fuel mixture having a second air-to-fuel ratio greater than the first air-to-fuel ratio into the plasma fuel reformer.

2. The plasma fuel reformer assembly of claim 1, wherein the air/fuel input assembly comprises a fuel injector, and the reformer controller is electrically coupled to the fuel injector.

3. The plasma fuel reformer assembly of claim 1, wherein the air/fuel input assembly comprises an electrically-operated air inlet valve, and the reformer controller is electrically coupled to the air inlet valve.

4. The plasma fuel reformer assembly of claim 1, further comprising a sensor to sense the amount of soot within the soot trap, wherein the plurality of instructions, when executed by the processing unit, further causes the processing unit to:

generate a soot-content control signal when the amount of soot particulate accumulation within the soot trap of the plasma fuel reformer reaches a predetermined level, and operate the air/fuel input assembly to advance the second air/fuel mixture in response to generation of the soot-content control signal.

5. The plasma fuel reformer assembly of claim 1, further comprising a pressure sensor to sense the pressure drop across the soot trap, wherein the plurality of instructions, when executed by the processing unit, further causes the processing unit to:

generate a pressure-reached control signal when the pressure drop across the soot trap of the plasma fuel reformer reaches a predetermined level, and operate the air/fuel input assembly to advance the second air/fuel mixture in response to generation of the pressure-reached control signal.

6. The plasma fuel reformer assembly of claim 1, wherein the plurality of instructions, when executed by the processing unit, further causes the processing unit to:

determine when a predetermined period of time has elapsed since soot was last purged from the soot trap of the plasma fuel reformer, and generate a time-lapsed control signal in response thereto, and operate the air/fuel input assembly to advance the second air/fuel mixture in response to generation of the time-lapsed control signal.

7. The plasma fuel reformer assembly of claim 1, wherein the plasma fuel reformer comprises a housing defining a reformate gas outlet, and the soot trap of the plasma fuel reformer is positioned within the housing at a position upstream of the reformate gas outlet.

8. The plasma fuel reformer assembly of claim 1, further comprising a conduit fluidly coupled to the plasma fuel reformer, wherein the soot trap of the plasma fuel reformer is positioned within the conduit.

* * * * *